United States Patent [19]
Pietsch

[11] 3,948,638
[45] Apr. 6, 1976

[54] METHOD FOR THE PRESS GRANULATION OF INDUSTRIAL DUSTS SEPARATED IN DUST REMOVAL SYSTEMS

[75] Inventor: Wolfgang Pietsch, Lowenstein-Hirrweiler, Germany

[73] Assignee: Hutt GmbH, Stuttgart, Germany

[22] Filed: Mar. 22, 1974

[21] Appl. No.: 453,824

[30] Foreign Application Priority Data
Mar. 23, 1973  Germany............................ 2314637

[52] U.S. Cl............................................ 75/3; 75/25
[51] Int. Cl.² ...................... C22B 1/08; C21B 3/04
[58] Field of Search..................................... 75/3, 25

[56] References Cited
UNITED STATES PATENTS
2,631,178  3/1953  Morton................. 75/25

*Primary Examiner*—Peter D. Rosenberg
*Attorney, Agent, or Firm*—McDougall, Hersh & Scott

[57] ABSTRACT

A material treating system wherein the material is fed into a reduction furnace or reactor or similar structure whereby portions of the material issue from the furnace in the form of dusts carrying one or more surface reaction products such as oxides, hydroxides, carbonates and carbon containing products. The dust is mixed with from 10 to 40 percent by weight of the material in the form of dust which is untreated and which is, therefore, substantially free of the reaction products. A briquetting press or other agglomerating means is employed for forming the mixture into agglomerated pieces which are then fed as granules, with or without comminuting, into the reactor as part of the reactor charge.

7 Claims, 1 Drawing Figure

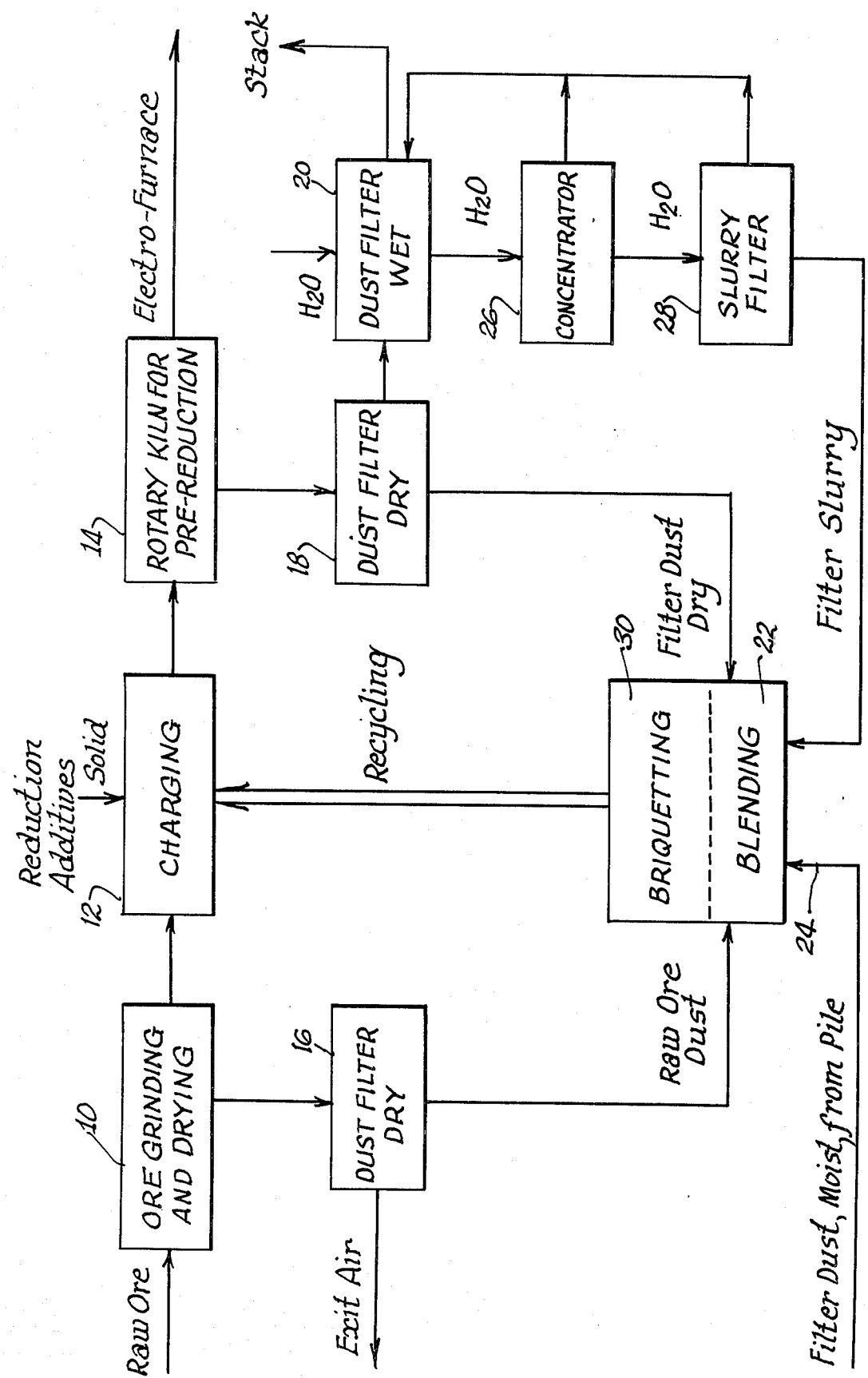

METHOD FOR THE PRESS GRANULATION OF INDUSTRIAL DUSTS SEPARATED IN DUST REMOVAL SYSTEMS

The invention relates to a method for the press granulation of industrial dusts of a type containing oxide, hydroxide, carbonate or carbon components. The invention is particularly directed to the handling of such dust having the components finely dispersed at the surface, the dusts having been separated as a result of a treatment in a preceding operation and then collected in dust removal systems placed downstream from furnaces and reactors. The invention contemplates the addition of an agglutinate and of water, if necessary. By the method, the dusts are converted into granules with properties of strength adequate for reuse in the operation.

In view of the increasingly stringent ordinances about environmental protection, many industrial enterprises are facing the problem of how to dispose of large quantities of solids separated in dust removal systems. Depending on the point of collection and the dust removal system being utilized, the particle size of the separated dust is in the order of size ranging from millimeters, and fractions of a millimeter to less than one-thousandths of a millimeter.

Such finely dispersed solids offer particular problems, particularly when their granule size is in the micrometer range. Because of their large surface area, they have on the one hand a tendency toward the formation of bridges in silos and conveying vessels, and on the other hand they are viscous like water when they are aerated sufficiently. Likewise on account of their large surface area, they are very reactive; spontaneous oxidation processes and dust explosions are quite common, particularly when the dust is obtained hot and separated in dry condition.

The greatest danger of fine and finely dispersed solids separated from gases and liquids, however, consists in the threat of renewed pollution of air and water. In order to combat this danger, granule enlargement methods frequently are applied which are based on the fact that as a result of the influence of forces and/or by the addition of agglutinates, binding forces become effective between the finely dispersed solid particles, and coarse pieces of agglomerates or granules results.

Such methods for the enlargement of granules of finely dispersed solids are known in larger numbers (see H. Rumpf, Chemie-Ingenieur-Technik [Chemistry Engineer Technique], Year 30 (1958), Volume 5, page 329 – 336 and W. Pietsch CZ-Chemie Technik [CZ Chemistry Technique], Year 1 (1972), volume 3, page 116–119). They include structural granulation methods in drums, plates and cones, in vibrating troughs, in a fluid bed, in mixers and the like. These methods generally require agglutinates. In one system, solid agglomerates are produced which are hardened by various methods of after-treatment. In another granule enlargement method known from prior art, a pelletizing method, an agglutinable mass or one provided with agglutinates is pressed through apertures in a stencil. With this method, too, an after-treatment is necessary frequently to achieve the required final solidity.

The direct production of solid agglomerates is possible in many cases also without the addition of agglutinates by pressing agglomeration methods, where the finely dispersed solid is compacted under the effect of high forces in die or roller presses. Pellets and formed bodies of almost any shape, such as briquets, plate-like bodies, or shells are produced which can be converted by comminuting and screening into granules of a defined granule size.

In many cases, the finely dispersed solid particles (dust particles) separated in dust removal systems, particularly those placed downstream from furnaces and reactors utilized in ore smelting, contain sufficient valuable components for further processing. Processing of the separated dusts for renewed use in the process itself or in another method would, therefore, be justifiable if it could be carried out economically. However, generally this economic feasibility is absent, as the finely dispersed dust particles cannot be used directly or be fed back into the process without constituting a danger to the environment. The separated dust must, therefore, be granulated. However, the granule enlargement method can be implemented economically only if it is possible to produce solid granules of a suitable character. Specifically, the granules must be appropriate for substantially dust-free handling, for storage over suitable periods of time, and of a type which require no after-treatment.

There is particular interest in the recovery of dusts accumulating in large quantities as they are collected in the treatment of mineral raw materials in furances and reactors. Such finely dispersed solid particles often are covered with a thin layer of carbon black or enveloped by other reaction products, so that components containing oxides, hydroxides and/or carbonates or carbon are present. The agglutinating properties of such finely dispersed solid particles are so poor even when applying high compression forces that the addition of agglutinate becomes necessary to achieve the necessary strengths of granules and/or agglomerates.

The materials suggested as agglutinates according to the prior art mostly are relatively low-cost waste products, such as bitumen and other tar products, molasses, sulfite waste lye, etc. The disadvantage of these agglutinates resides in the fact that by their presence they lower the concentration of the valuable components in the granule and frequently introduce impurities inadmissible for the subsequent preparation process. Sulphur, for example, is usually an objectionable impurity and its presence can also create nnew problems for environmental protection. Because they are needed in large quantities, the costs for the agglutinate itself, the shipping and storage of the material, and a number of other factors are so detrimental that the economic feasibility of such systems is doubtful in most cases.

It is a general object of this invention to provide an improved method for the handling of industrial dusts whereby the dusts can be recycled thereby resulting in a saving of material and in elimination of pollution problems.

It is a more particular object of this invention to provide a method for the press agglomeration of dusts having surface reaction products associated therewith wherein the dusts are agglomerated without the necessity for agglutinates which would contaminate the resulting granules.

These and other objects of this invention will appear hereinafter and for purposes of illustration but not of limitation, specific embodiments of the invention are shown in the accompanying drawings in which the FIGURE is a flow chart illustrating an example of the application of the method of the invention.

This invention generally relates to a method for the press granulation of industrial dusts separated in dust removal systems placed downstream from furnaces and reactors. As noted, such dusts have poor binding properties caused by the preceding operations, and this method is concerned with increased economic feasibility and with the elimination of any problems during the renewed use of the granulated dusts.

The invention is particularly directed to the press granulation method initially mentioned. According to the invention, collected industrial dusts are admixed with 10 to 40 percent by weight of untreated solids of a composition similar to the industrial dusts with the untreated industrial dusts acting as agglutinates. The surprising discovery has been made that by using untreated finely dispersed solids, for example untreated mineral dust, as agglutinate for the dust separated in the dust removing systems or filters, a mixture is produced which can be converted by press agglomeration directly into briquets or granules with a strength appropriate for a return into the process. Because in this method, no impurity is introduced into the mixture, and since the agglutinate is available in an almost unlimited quantity where it is needed, a highly economical method results.

It has been demonstrated that prior to the treatment of the mineral raw materials in the furnaces or reactors where the contamination with the reaction products takes place, the solid in finely dispersed form frequently shows an excellent compactability or agglomerability. Briquets of high strength are produced directly without the addition of agglutinates by applying high pressing forces.

The method according to the invention is applicable to many solids, in fact not only to mineral raw materials, but also to metal dusts having surfaces contaminated by oxidation and layers of carbon black, these dusts having binding properties very much worse than those of the clean metal powders. In this case also, quality briquets or granules can be produced by admixing pure metal powder with the metal powder contaminated on the surface. Quite generally the particular composition of the solid is not too critical, because almost all untreated materials possess adequate binding properties when subjected to adequate pressures, while layers of oxide and carbon on the surface of such solids will impede or prevent binding even at extreme compression pressures.

The proportion of untreated finely dispersed solid material to be admixed with the separated dust naturally depends to a certain degree on the nature of the solid itself, but more specifically on the requirements of strength to be met by the granule.

With many substances, an admixture of 20 to 30 percent by weight of untreated finely dispersed solid material proved to be particularly favorable. If the press granulation is carried out with the addition of water, the over-all mixture to be granulated should be adjusted to a moisture content of 5 to 10 percent by weight, preferably 7 to 8 percent by weight. This favors the binding during the press agglomeration and the quantity of dust resulting from briquetting is reduced. Even with a subsequent sorting or screening, the build-up of dust is reduced. The moisture content is adjustable exclusively by adding water; however, the addition of water can be accomplished, at least in part, by using dusts separated wet. The method according to the invention thus admits the use of not only dryers, but also of wet filters in the dust removal systems, without resulting in a complication of the subsequent press granulation. This is significant in view of the fact that wet methods may be partly necessary in the separation of very fine dusts.

The untreated starting material is usually available in sufficient quantities in finely dispersed form in smelting and processing facilities, because the starting materials frequently contain a significant proportion of fines and because major quantities of the fines are yielded in the preparation systems preceding entry into the reaction furnaces and the like. An improvement of the method according to the invention, in the case where dusts are used which have been separated in a dust removing facility downstream from a grinding facility, offers the advantage that with comparatively small untreated quantities of dust, the required strengths can be achieved because the fresh fragmentary surfaces of the solid particles have high binding powers. In case of a larger addition of the untreated fines particularly high strengths are attainable.

If granules can be returned into the process or be directed to another process only with a certain minimum size, it is appropriate to screen them to the size appropriate for renewed feeding and to recycle the fine share into the mixture to be agglomerated. In other words, the share of fines is returned into the agglomeration process so that even this share of fines does not raise any problems. The method according to the invention proves to be particularly satisfactory in a reduction process of latheritic iron-nickel ore in a reduction furnace where about 30 percent finely dispersed ore is added to the dust separated behind the reduction furnace. The mixture is press-agglomerated with a moisture content of about 7 percent by weight and granules are returned into the process with over-all dimensions of about 5 mm prior to the reduction and/or ahead of the reduction furnace. In this connection, the size of the granules depends on the needs of the system involved and briquetting machines and the like can be readily designed to accommodate different systems. The size of the agglomerated product can be determined directly by the briquetting machine or other pressing equipment, or the product may be comminuted or divided, after pressing, into a desired size.

If the agglomeration is carried out in high pressure roller presses, it is possible to operate not only at high efficiency but also with a comparatively low proportion of untreated finely dispersed solids in the mixture of fines.

The flow chart shown in the drawing illustrates an application of the principles of the invention. As shown, raw ore is introduced into an ore grinding and drying construction 10 with the major portion of ore then being fed into a charging mixer or the like at 12. Various additives are combined with the ore at this point, and the output thereof is fed to kiln 14. In this instance, the kiln is employed for pre-reduction purposes with the output of the kiln being fed to an electro furnace for further treatment.

A portion of the output of the grinding facility 10 will necessarily be in dust form, and this dust is recovered by means of filter 16. Similarly, the output of the kiln 14 will include a dust portion which is collected by means of dry filter 18 and wet filter 20.

The collected dust portions are fed to a blender 22. As shown, the dust from grinder 10 as well as the dry and wet dust portions from kiln 14 are all fed to the blender. A further source of dust may be provided, for example, dust obtained from the ore storage area which could be wet or dry, and which is fed into the blender through line 24. As shown, the wet portion may be delivered to the blender after passing through concentrator 26 and filter 28 in conventional fashion.

With a system of the type shown, the portions fed to the blender are easily maintained in desired proportions. The mixer obtained is then fed to a briquetting machine 30 or to similar pressing equipment, and the production is then in a condition to be recycled into the charging equipment 12. Depending upon the size of the briquets or other pressed material, comminuting equipment is alternatively used. For example, if pressing equipment forms the mixture into sheets, suitable chopping devices could be utilized to reduce the pressed material to a size suitable for charging purposes. Any dust resulting from a comminuting operation or collected from formed briquets or collected during handling of the granules may be recycled into blending structure 22.

As will be apparent, the system described completely avoids the use of any agglutinates which would contaminate the charge. All of the material required for achieving the granules in a suitable form for charging is readily obtained and is necessarily on the same site as the grinding, charging and heating equipment. Thus, great economies are achieved in the operation while pollution problems are virtually completely eliminated.

Below the invention will be explained in more detail on the basis of a specific embodiment.

Latheritic nickel ore is pre-reduced in a facility for the production of iron-nickel by adding lignite as a solid reducing agent in rotary tube furnaces. This produces large quantities of dust consisting in part of ore present in various stages of reduction, of lignite, and of combustion residues (ash). The dust contains up to 30 percent by weight utilizable carbon and up to 70 percent by weight ore with only a slightly reduced content of utilizable iron-nickel.

The major share of dust (about 60 to 70 percent by weight) is separated dry in multi-cyclones, while the fine and finest dust is washed out in Venturi wet washers. The washing water is pre-clarified in a rotary thickener and the slurry is dehydrated on drum filters.

Both dust shares (wet and dry) are mixed in the facility for the recovery of dust with at least 10, but preferably 20 to 30 percent by weight dry nickel ore dust originating from the electro filters of the ore grinding installation. A mixture is produced of at least 63 percent by weight filter dust, a maximum of 30 percent by weight nickel ore dust and about 7 percent by weight water. The moisture content of 7 percent by weight is usually obtained by admixture of the wet filter dust, and this favors the agglomeration and reduces the formation of dust in the briquetting facility. Where the wet filter dust is not obtained continuously, water can be sprayed into the mixer to achieve a 7 percent by weight moisture content of the mixture.

This mixture is compressed in high pressure roller presses into almond-shaped briquets. The product is screened at 5 mm. The share greater than 5 mm is recycled into the rotary tube furnace batch, while the fines (smaller than 5 mm) are admixed with the premix and briquetted anew.

In one example, 10,000 tons of filter dust were obtained in a nickel ore facility of the above described type and briquetted in the above described manner and returned into the process. By adding the briquets to the furnace batch, the dust yield is increased by about 30 to a maximum of 35 percent by weight; this factor is to be considered in the layout of the filter and briquetting installation. Nevertheless, the recovery system operates with considerable profit, in addition to the advantages realized by elimination of the dust deposits and the environmental problems.

It will be understood that various changes and modifications may be made in the construction described which provide the characteristics of the invention without departing from the spirit thereof particularly as defined in the following claims.

That which is claimed is:

1. In a material treating system wherein the material is fed into a reactor and wherein portions of the material exit from the reactor as flue dust with the surfaces of the dust particles carrying at least one reaction product from the group comprising oxides, hydroxides, carbonates and carbon containing products, the improved method for recovering and agglomerating the dust and for recycling the dust comprising the steps of mixing with the dust from 10 to 40 percent by weight of dust comprising material of substantially the same composition but which has not previously been fed to a reactor whereby it is substantially free of said reaction products, subjecting the mixture to compression forces for agglomerating the mixture into granules, and introducing the granules as a portion of the material fed to the reactor.

2. A method according to claim 1 comprising the reduction of lateritic iron-nickel ore in a reduction furnace, the method involving the addition of about 30 percent by weight of unreacted finely dispersed ore to ore dust recovered as flue dust from a reactor for the ore, the mixture being agglomerated by compression having a moisture content of about 7 percent by weight, and wherein granules with a size of about 5 mm are formed and introduced in admixture with the ore fed to the reactor.

3. A method according to claim 1 including the step of adding water to the mixture in an amount from 5 to 10 percent by weight prior to the agglomerating.

4. A method according to claim 3 wherein a portion of the flue dust exiting from the reactor is recovered in a separating process which adds waters to the portion, said portion with the water added being included in said mixture to provide said water in the mixture.

5. A method according to claim 1 wherein said dust includes at least some particles less than one thousandths of a millimeter in size.

6. A method according to claim 1 wherein said dust which is free of reaction products is obtained at least in part by separating dust from the product of a grinding step conducted prior to the delivery of the material to the reactor.

7. A method according to claim 1 including the step of screening the granules prior to introducing the granules as part of the material fed to the reactor, and adding the fines resulting from the screening to said mixture to be agglomerated.

* * * * *